United States Patent [19]

Uetani et al.

[11] Patent Number: 5,069,989
[45] Date of Patent: Dec. 3, 1991

[54] ALKALINE CELL

[75] Inventors: Yoshio Uetani, Ibaraki; Tomotaka Ozeki, Takatsuki; Kazuo Ishida, Suita, all of Japan

[73] Assignee: Hitachi Maxell, Ltd., Osaka, Japan

[21] Appl. No.: 537,118

[22] Filed: Jun. 13, 1990

Related U.S. Application Data

[63] Continuation of Ser. No. 787,017, Oct. 15, 1985, abandoned, which is a continuation of Ser. No. 561,348, Dec. 14, 1983, abandoned.

[30] Foreign Application Priority Data

Dec. 15, 1982 [JP] Japan .................. 57-220695
Dec. 15, 1982 [JP] Japan .................. 57-220696
Dec. 15, 1982 [JP] Japan .................. 57-220697
Dec. 15, 1982 [JP] Japan .................. 57-220698
Dec. 15, 1982 [JP] Japan .................. 57-220699

[51] Int. Cl.$^5$ .......................................... H01M 2/04
[52] U.S. Cl. .................................. 429/164; 429/176
[58] Field of Search ............................ 429/164, 176

[56] References Cited

U.S. PATENT DOCUMENTS 4,128,705 12/1978 Winsel .................... 429/180 X
4,260,669 4/1981 Kerg ........................ 429/215

OTHER PUBLICATIONS

*Metals Handbook,* 8th ed., vol. 1, American Society for Metals, 1972, pp. 564, 565, 570, 571.

*Primary Examiner*—Stephen J. Kalafut
*Attorney, Agent, or Firm*—Birch, Stewart, Kolasch & Birch

[57] ABSTRACT

An alkaline cell comprising a positive electrode can for accommodating positive active materials formed from stainless steel containing more than 23% chrome by weight for preventing the positive electrode can from being damaged in gastric juice. The stainless steel may be coated with nickel prevent the release of $Cr^{6+}$ ions into electrolyte of the cell.

9 Claims, 2 Drawing Sheets

ALKALINE CELL

This application is a continuation of copending application Ser. No. 06/787,017 filed on Oct. 15, 1985, which is a continuation of application Ser. No. 06/561,348, both now abandoned.

BACKGROUND OF THE INVENTION

1. Field of the Invention

The present invention relates to an alkaline cell, and more particularly to a small sized alkaline cell having its surface processed with anticorrosion material.

2. Discussion of Related Art

With progress of a wide use of various cell appliances such as game machines and/or game watches using one or more small sized alkaline cells, accidents in which a child accidentally swallows a small sized cell happen. It is reported that in such an accident, the enclosure of the cell swallowed may be corroded in the stomach, whereby the human body may be harmed by an alkaline electrolyte which leaks out of the cell.

As the result of study, the present inventors discovered that the corrosion of the enclosure of the conventional cell occurs in such a manner that the electricity of the cell is discharged in the gastric juice of an acidic solution which includes halogen ions, whereby the enclosure or positive electrode can of the cell is corroded. The corrosion of the positive electrode can of the cell in the gastric juice progresses relatively rapidly compared with the corrosion that occurs in a normal chemical process. The positive electrode cans of the conventional flat type cells are made of iron with a nickel plating surface lacking resistivity against the acidic corrosion. If such a conventional flat type cell is swallowed, there is a great possibility of the corrosion of the positive electrode can, before the cell is excreted, during staying of the cell swallowed in the human body.

SUMMARY OF THE INVENTION

The present invention is made to eliminate such drawbacks as mentioned above being inherent in the conventional alkaline cell and has as its essential object to provide an alkaline cell having a positive electrode can which is not readily corroded in the gastric juice so as to prevent leakage of harmful materials out of the cell even if the cell is swallowed in a human body.

According to the present invention, the positive electrode can may be formed by a high chrome stainless steel sheet which includes chrome more than 23% by weight of chrome.

The stainless steel may be SUS 447J1, SUS329J1, SUS 329J2, and SUS 310S.

The stainless steel of the positive electrode can may be coated with one or more nickel layers in order to prevent releasing of hexachrome ions from the stainless steel.

The nickel layer may be formed either on the inner surface or outer surface of the positive electrode can.

The nickel layers may be formed on both the inner surface and the outer surface of the positive electrode can.

Preferably, the thickness of the nickel layer of the positive electrode is more than 3μm.

DETAILED DESCRIPTION OF THE PREFERRED EMBODIMENTS

Figure 1:
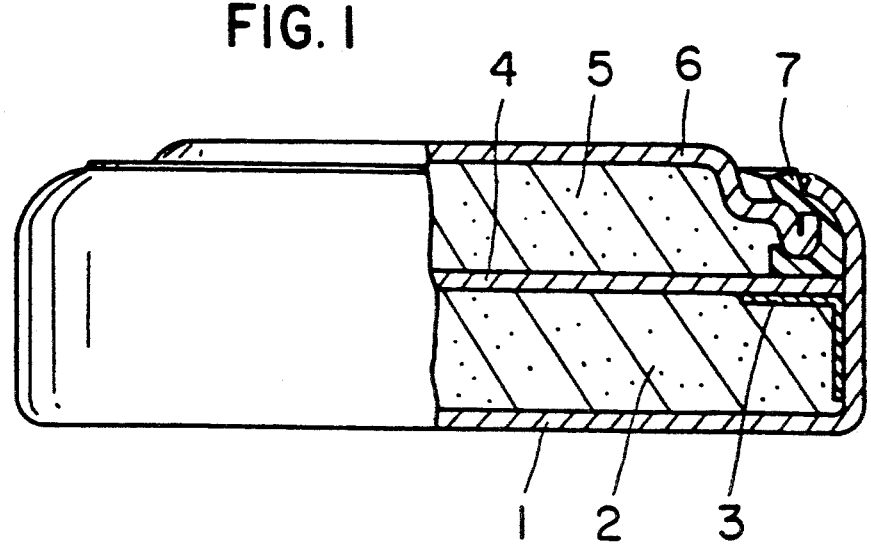
FIG. 1 is a side view of one embodiment of an alkaline cell according to the present invention.
Figure 2:
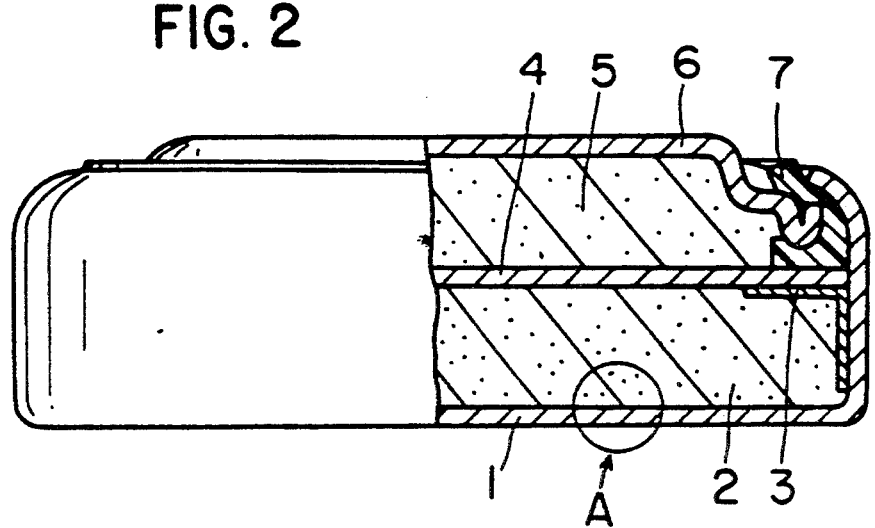
FIG. 2 is a side view of another embodiment of an alkaline cell according to the present invention.

Before the description proceeds, it is noted that like parts are designated by like reference numerals throughout the drawings.

It is also noted that the term of the small sized cell used herein includes all kinds of small sized cells such as a button type, flat disc type, cylindrical type, each comprising an alkaline aqueous solution as an electrolyte and a laminated cell with a plurality of cells of one of the above described types are laminated.

The following experiments were made to find materials suitable for the positive electrode cans of the alkaline cells to prevent corrosion of the positive electrode in the gastric Juice. Sample electrodes were made using the stainless steel, iron and nickel as shown in the table 1. Each of the samples was soaked in an artificial gastric juice consisting of aqueous an solution including 2 g of NaCl in one liter and 24 ml of HCl of 10% by weight with a platinum plate opposite to the sample electrode as an opposing electrode. A variable voltage is applied across the sample electrode and the opposing electrode, whereby corrosion commencing voltages were measured. The results of the measurement are shown in the table 2. The term "corrosion commencing voltage" means a potential at the rising point of the polarization curve of the sample electrode in the artificial gastric juice. The value shown in the table 2 is the potential with respect to a reference electrode of a silver chloride.

As apparent from the tables 1 and 2, the corrosion commencing voltage becomes remarkably high against the stainless steel having more than 23% of chrome. In other words there is a remarkable difference of the corrosion commencing voltages between the stainless steel having more than 23% chrome and the stainless steel having less than 21% chrome.

A plurality of cells as described hereinafter in the examples 1 and 2 were made based on the results mentioned above and compared with a conventional cell in terms of occurrence of damage of the cells in the artificial gastric juice.

EXAMPLE 1

A small sized cell of LR 43 as shown in FIG. 1 was made using a positive electrode can 1 of high chrome stainless steel of SUS 447J1. In FIG. 1 there is seen a positive electrode can 1, a positive electrode material mix 2 comprising, for example, silver oxide as a main ingredient, an annular metallic pedestal 3 fixed on the inner wall of the positive electrode can 1, a separator 4 comprising a microporous polypropylene film imparted with a hydrophilic property, a cellophane film and a vinylon-rayon mixed paper, a negative electrode material mix 5, a negative electrode terminal plate 6, as the negative electrode collector, made of a clad plate consisting of a nickel layer on the outer face, austenitic stainless steel plate of SUS304 as a base material and a copper layer on the inner face and formed in a shape having the peripheral turn-up part by draw forming, and an annular gasket 7 made of nylon and placed at the turn-up pat of the negative electrode terminal plate 6.

Alkaline electrolyte made of potassium hydroxide aqueous solution of 35% zinc oxide solved is injected in the cell thus formed. The positive electrode material mix 2 is a press formed body, having a diameter of 10.9 mm and a thickness of 1.8 mm composed of 510 mg of manganese dioxide, phosphorus graphite and poly acrylic sodium and being pressed by a pressure of 1t/cm$^2$. The negative active materials 5 consists of zinc amalgam of weight 110 mg with the rate of amalgamation of 9%.

EXAMPLE 2

Example 1 was substantially repeated except that a stainless steel plate of SUS447J1 was used for the positive electrode can 1 in place of SUS329J1 in the example 1.

COMPARATIVE EXAMPLE 1

Example 1 was substantially repeated except that a nickel plated iron plate of a thickness of 0.25 mm was used for the positive electrode can 1.

The respective cells made in a manner as described above were soaked in the artificial gastric juice as defined above for 24 hours under the temperature of 37° C. and damage of the cells was inspected by measuring the value of potassium ion in the artificial gastric juice. The results are shown in the table 3. In case of pin holes on the positive electrode can due to corrosion in the artificial gastric juice, the electrolyte might leak out the cell through the pin holes in the artificial gastric juice, the method of detecting sodium ion was used for inspecting the damage of the cells.

As shown in the table 3, the conventional cell was damaged in 24 hours in the artificial gastric juice, and to the contrary the cells according to the examples 1 and 2 were never damaged after not only 24 hours but also 200 hours in the artificial gastric juice.

Since the positive electrode cans 1 of the cells shown in the examples 1 and 2 are made of high chrome stainless steel, which is easily electrolytically oxidized by the effect of positive active materials in the alkaline electrolyte solution, hexa valent chrome ions ($Cr^{6+}$) may easily be released from the positive electrode can in the electrolyte solution, and the released ions are shifted to the negative electrode, whereby an undesired layer may be formed surrounding the surface of each of the negative active materials and causing the negative active materials to be ineffective resulting in lowering the voltage of the cell when a load is connected across the cell (such voltage will be referred to as closed circiut voltage hereinafter). In order to prevent the releasing of the hexa valent chrome ions, a nickel layer or nickel layers may be formed on the surface of the positive electrode can 1.

EXAMPLE 3

Figure 3:
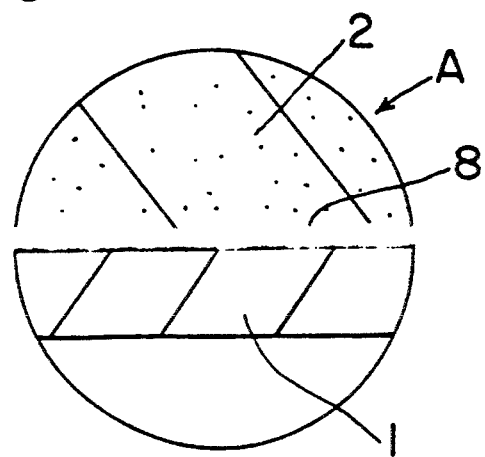
FIG. 3 is a partial enlarged cross sectional view showing the part surrounded by the circle A in FIG. 2, and FIGS. 4 and 5 are partial enlarged cross sectional views of further modifications of the alkaline cells showing the part surrounded by the circle A in FIG. 2.

In addition to the cell shown in the Example 2 a nickel layer 8 as shown in FIG. 3 was plated on the inner surface of the positive electrode can 1 to a thickness of 3μm. For the comparative reference the cell shown in the example 2 was used. The cells of the examples 2 and 3 were stored in an atmosphere of a temperature of 60° C. for 5 days and 10 days. Then the open circuit voltage and the closed circuit voltage were inspected. The result of the inspection is shown in the table 4. As shown in the table 4, the open circuit voltage and the closed circuit voltage of the cell of example 3 are much stable compared with the cell of example 2 in which the open circuit voltage and the closed circuit voltage are lowered from the initial state. According to the table 4, the closed circuit voltage of the cell of the example 2 is remarkably lowered due to the releasing of the hexa valent chrome ions in the electrolyte. The nickel layer 8 may be provided by either nickel plating on the stainless steel sheet or laminating a nickel clad plate onto the stainless steel sheet. Preferably, the thickness of the nickel layer is more than 3μm.

EXAMPLE 4

Figure 4:
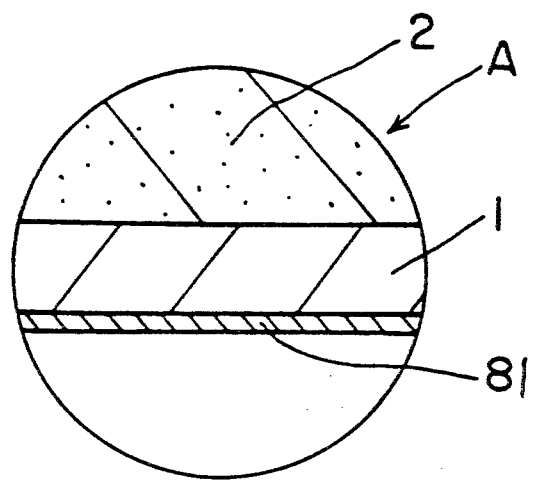

A nickel layer 81 was plated on the outer surface of the positive electrode can 1 in the cell of the example 2 with the thickness of 3μm as shown in FIG. 4. As a comparative example, the cell in the example 2 was used. Both of the cells were soaked in the gastric juice defined above of 37° C. for 24 hours. The amount of releasing of the hexa valent chrome ions ($Cr^{6+}$) in the gastric juice described above was measured by a spectroscopic analysis. The result of the measurement is shown in the table 5. The amount of releasing of the hexa valent chrome ions in the cell of the example 4 is remarkably decreased compared with that of the cell of the example 2. By coating the outer surface of the positive electrode can 1 with the nickel layer, dissolving of nickel commences at a voltage lower than the voltage for releasing the hexa valent chrome ions, so that releasing of the hexa valent chrome ions can be suppressed.

EXAMPLE 5

Example 4 was substantially repeated with the ratio W/Q of the amount W of nickel of the nickel layer 81 and the the quantity Q of electricity of the positive electrode changed by various values as shown in the table 6. In the examples 5, the quantity Q of the current of the positive electricity was 125 mAh (miliampere hour). The result of the inspection is shown in the table 6. According to the table 6, the amount of releasing of the hexa valent chrome ions can be decreased where the ratio W/Q is more than $5 \times 10^{-12}$ mg/mAh.

EXAMPLE 6

Figure 5:
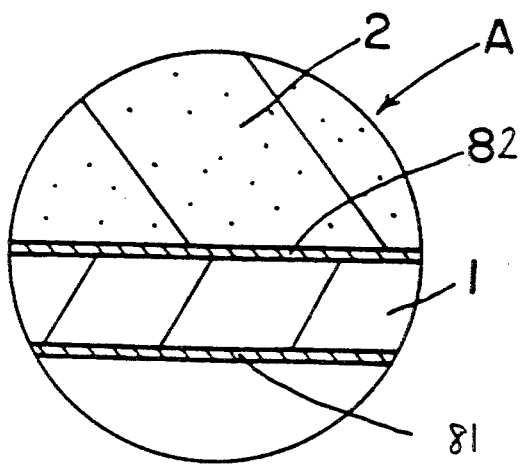

Nickel layers 81 and 82 were plated on the outer surface and the inner surface of the positive electrode can 1 made in a same manner as the cell of the example 2 with a thickness of 3μm as shown in FIG. 5. The cells of the examples 2, 3 and 4 were used for the comparative examples in addition to the conventional cell. These cells were stored in an atmosphere of 60° C. for 10 days. Thereafter the closed circuit voltage was measured. Also, these cells were soaked in the gastric juice as described above for 50 hours under the temperature of 37° C. and the amount of releasing of the hexa valent chrome ions was measured and degree of damage of the cells was inspected. The results of the inspection are shown in the tables 7 and 8. As understood from the tables 7 and 8, in the cell of the example 6, the amount of decreasing of the closed circuit voltage of the cell and the amount of releasing of the hexa valent chrome ions are small compared with those of the cells of the examples 2, 3 and 4 and the conventional cells. Also damage of the the cells did not occur in the examples 2, 3, 4 and 6.

It is noted that in the examples 5, the amount W of nickel means that of the nickel layer formed on the outer face of the positive electrode can and does not include the amount of nickel contained in the material of the positive electrode can per se.

TABLE 1

| Kinds of stainless steel | Element | | | |
|---|---|---|---|---|
| | Cr | Ni | Mo | Others |
| SUS 447 J1 | 28.5–32.0 | less than 0.50 | 1.50–2.50 | — |
| SUS 329 J1 | 23.0–26.0 | 4.0–6.0 | 1.0–2.5 | N added |
| NTK 30 - A | 19.0–21.0 | 28.0–30.0 | 2.0–3.0 | Cu 3.0–4.0 |
| NTKM - 5 | 17.0–19.0 | 15.0–17.0 | 4.5–6.0 | — |
| SUS 316 | 16.0–18.0 | 12.0–15.0 | 2.0–3.0 | — |
| SUS 316 L | 16.0–18.0 | 12.0–15.0 | 2.0–3.0 | — |
| NTKU - 1 | 18.0–20.0 | — | 1.75–2.25 | — |
| SUS 304 | 18.0–20.0 | 8.0–10.5 | — | — |

Note:
NTK30-A, NTKM-5 and NTKU-1 are trade name of Nippon Kinzoku Kabushiki Kaisha

TABLE 2

| Kind of metal | Corrosion commencing voltage (V) |
|---|---|
| SUS 447 J1 | +0.93 |
| SUS 329 J1 | +0.90 |
| NTK 30 - A | +0.48 |
| NTKM - 5 | +0.48 |
| SUS 316 | +0.18 |
| SUS 316 L | +0.32 |
| NTKU - 1 | +0.30 |
| SUS 304 | +0.45 |
| Iron | −0.50 |
| Ni | −0.21 |

TABLE 3

| Example 1 | not damaged |
|---|---|
| Example 2 | not damaged |
| Comparative Example | damaged |

TABLE 4

| Kinds of cells | Initial | | After Storage | | | |
|---|---|---|---|---|---|---|
| | | | 60° C. × 5 days | | 60° C. × 10 days | |
| | Open Vol. | Closed Vol. | Open Vol. | Closed Vol. | Open Vol. | Closed Vol. |
| Example 3 | 1.57 V | 1.48 V | 1.54 V | 1.44 V | 1.53 V | 1.43 V |
| Example 2 | 1.57 V | 1.48 V | 1.52 V | 0.82 V | 1.41 V | 0.59 V |

Note
1: Open Vol.: Open circuit voltage (D.C. voltage)
Closed Vol.: Closed circuit voltage (D.C. voltage)
2: Closed circuit voltage was measured 5 seconds after discharge through 100 Ω load.

TABLE 5

| | Amount of $Cr^{6+}$ released (mg) |
|---|---|
| Example 4 | 0.21 |
| Example 2 | 2.50 |

TABLE 6

| W/Q (mg/mAh) | Amount of $Cr^{6+}$ released (mg) |
|---|---|
| 0 | 2.50 |
| $2 \times 10^{-2}$ | 0.33 |
| $5 \times 10^{-2}$ | 0.07 |
| $10 \times 10^{-2}$ | <0.05 |
| $15 \times 10^{-2}$ | <0.05 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

TABLE 7

| Cell | Closed circuit voltage | |
|---|---|---|
| | Initial | After 10 days with 60° C. |
| Example 5 | 1.48 | 1.47 |
| Example 3 | 1.48 | 1.45 |
| Example 4 | 1.48 | 0.75 |
| Example 2 | 1.48 | 0.77 |
| Conventional Cell | 1.48 | 1.45 |

TABLE 8

| | Amount of $Cr^{6+}$ released (mg) | |
|---|---|---|
| Example 6 | 0.17 | not damaged |
| Example 3 | 2.20 | not damaged |
| Example 4 | 0.11 | not damaged |
| Example 2 | 2.70 | not damaged |
| Conventional cell | 0 | damaged |

What is claimed is:

1. An alkaline cell consisting essentially of positive active materials, negative active materials, an alkaline aqueous solution as an electrolyte, a negative electrode terminal plate for accommodating said negative active materials, and a positive electrode can for accommodating said positive active materials, said cell having an open circuit voltage of about 1.57 volts, wherein said positive electrode can comprises stainless-steel including more than 23% by weight of chrome such that said positive electrode can is resistant to acidic corrosion from gastric juices.

2. The alkaline cell according to claim 1, wherein an inner surface of said positive electrode can is coated with a nickel layer.

3. The alkaline cell according to claim 1, wherein an outer surface of said electrode can is coated with a nickel layer.

4. The alkaline cell according to claim 1, wherein an inner surface and an outer surface of said positive electrode can are coated with nickel layers, respectively.

5. The alkaline cell according to claim 3, wherein a ratio W/Q is equal to or greater than $5 \times 10^{-2}$ mg/mAh, wherein
W is the total weight of the nickel layer and Q is the current of said positive active material which consists of manganese dioxide.

6. The alkaline cell according to claim 2, wherein the nickel layer has a thickness of at least 3 μm.

7. The alkaline cell according to claim 3, wherein the nickel layer has a thickness of at least 3 μm.

8. The alkaline cell according to claim 4, wherein each nickel layer has a thickness of least 3 μm.

9. An alkaline cell consisting essentially of a positive active material comprising manganese dioxide, negative active materials, an alkaline aqueous solution as an electrolyte, a negative electrode terminal plate for accommodating said negative active materials, and a positive electrode can for accommodating said positive active materials, said cell having an open circuit voltage of 1.57 volts, wherein said positive electrode can comprises stainless-steel including more than 23% by weight of chrome such that said positive electrode can is resistant to acidic corrosion from gastric juices.

* * * * *